(12) United States Patent
Zuckerman

(10) Patent No.: US 11,640,643 B2
(45) Date of Patent: *May 2, 2023

(54) EXCHANGE FOR TRADING RADIO FREQUENCY USAGE RIGHTS

(71) Applicant: CFPH, LLC, New York, NY (US)

(72) Inventor: John Zuckerman, Chappaqua, NY (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,709

(22) Filed: Feb. 7, 2022

(65) Prior Publication Data

US 2022/0164907 A1    May 26, 2022

Related U.S. Application Data

(63) Continuation of application No. 16/900,513, filed on Jun. 12, 2020, now Pat. No. 11,244,414, which is a continuation of application No. 13/971,810, filed on Aug. 20, 2013, now Pat. No. 10,685,411.

(60) Provisional application No. 61/691,249, filed on Aug. 20, 2012.

(51) Int. Cl.
*G06Q 50/18* (2012.01)
*G06Q 20/38* (2012.01)
*G06Q 30/06* (2023.01)
*G06Q 50/26* (2012.01)

(52) U.S. Cl.
CPC .......... *G06Q 50/184* (2013.01); *G06Q 20/38* (2013.01); *G06Q 30/06* (2013.01); *G06Q 50/188* (2013.01); *G06Q 50/26* (2013.01)

(58) Field of Classification Search
CPC ...... G06Q 50/184; G06Q 20/38; G06Q 30/06; G06Q 50/188; G06Q 50/26
See application file for complete search history.

*Primary Examiner* — Aryan E Weisenfeld

(57) ABSTRACT

According to various embodiments, systems and methods are provided for enabling parties to create, define, buy, and sell usage rights in radio frequency (RF) ranges, e.g., via a computerized trading exchange. The usage rights may comprise exclusive or shared ownership or lease interests. A government or other entity may initially offer on the exchange usage rights in radio frequencies owned or controlled by the government. The usage rights may be sold to market participants, e.g., through a competitive bidding process such as a reverse auction, Dutch auction, RFQ, or other methodology. Such rights may be transferred subject to government use, e.g., in emergency situations. Information associated with offered RF usage rights such as historical usage data, geographical reach, and available RF equipment may be published on the exchange. The exchange may also enable secondary trading of usage rights.

20 Claims, 5 Drawing Sheets

SE Publishes Critical, Real-time Data → Generates Fair Pricing and optimum volume

FIG. 4

Spectrum Exchange Database

Geography

Historical Ownership

RF Band

Current Ownership/Secondary Lease Rights Holder(s)

Known Historical Interference (with what and specifically where in geography)

Known Current Interference (with what and specifically where in geography)

Data Enabling the Automated, Virtual Calculation of Path-Loss for Carriers Seeking to Use Same/Adjacent Spectrum in Same/Adjacent Geographies Historical Primary Use Expressed as a Percentage of Available RF Capacity (as detailed by subgeography as primary use rights holder can provide)

Current Secondary Use Expressed as a Percentage of Available RF Capacity (as detailed by subgeography as secondary use rights holder can provide)

Rolling Inventory of Associated Equipment Used for Operations (including, but not limited to, towers, antennae, multiplexers, etc.)

Historical Prices, as well as Current Bid and Ask, for Spectrum Licenses, Spectrum Use Rights, Equipment Leases)

Spectrum Exchange Publication of Actual Spectrum = Enhanced Asset Value Transparency

FIG. 5

Primary Holder Historical Usage
- Packaged and delivered periodically (when there is a classified or confidential use); or
- Reported instantaneously to Spectrum Exchange through dynamic interconnection with primary network Spectrum Exchange
- Centralized Repository of Spectrum Capacity Utilization expressed both Historically and in Real-Time
- Allows Market Participants to Gauge Relative Value of RF through Actual Usage Data Secondary Use Rights Holder(s)
- Reported instantaneously to Spectrum Exchange through dynamic interconnection with Secondary Use Rights Holder(s) network monitoring

EXCHANGE FOR TRADING RADIO FREQUENCY USAGE RIGHTS

RELATED APPLICATION

This application is a continuation of U.S. patent application Ser. No. 13/971,810 filed on Aug. 20, 2013 which claims the benefit of U.S. Provisional Application Ser. No. 61/691,249 filed Aug. 20, 2012, the disclosure of which is incorporated by reference herein in its entirety.

BACKGROUND

Radio frequency users such as commercial telecommunication providers typically use radio frequencies that the government has designated to be available for public and commercial use. A large range of the radio frequency spectrum usable for communications is reserved for use by the government. See, e.g., http://www.ntia.doc.gov/page/2011/united-states-frequency-allocation-chart. Additional background materials are available in the "Report to the President Realizing the Full Potential of Government-Held Spectrum to Spur Economic Growth" from the Executive Office of the President/President's Council of Advisors on Science and Technology dated July 2012, available at http://www.whitehouse.gov/sites/default/files/microsites/ostp/pcast_spectrum_report_final_july_20_2012.pdf.

BRIEF SUMMARY

Various embodiments are directed to systems and methods that enable parties to buy and sell usage rights in one or more radio frequency ranges. Such usage rights may comprise an exclusive or shared ownership interest in whole or in part, lease interest in whole or in part, or other interest. In some embodiments, a system may provide a computerized trading exchange where participants such as individual users, commercial users, telecommunications providers, government entities, and other entities may create, buy, and sell usage rights in radio frequencies. In some embodiments, an entity such as a government entity may initially offer on the exchange usage rights in radio frequencies owned or controlled by the government or another entity. Such rights may be subject to rights such as preemptive rights held by one or more government entities, e.g., for exclusive government use in emergency situations. Information relevant to the offered radio frequency rights may be published on the exchange, such as historical usage data, geographical reach, and available RF equipment. The usage rights may be sold to market participants, e.g., through a competitive bidding process such as a reverse auction, Dutch auction, RFQ, or other methodology. The exchange may also enable secondary trading of usage rights. Information relevant to the usage rights may be published on the exchange.

BRIEF DESCRIPTION OF THE FIGURES

FIG. 4 depicts an exemplary database diagram according to at least one embodiment of the systems and methods disclosed herein.

FIG. 5 depicts an exemplary data publication diagram according to at least one embodiment of the systems and methods disclosed herein.

DETAILED DESCRIPTION

Figure 1:
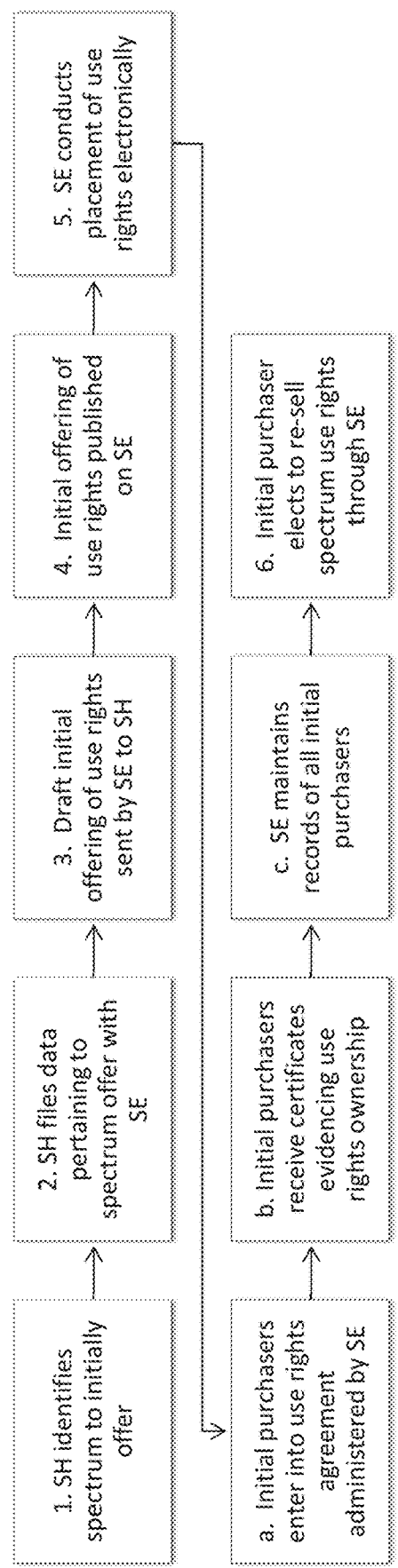
FIG. 1 depicts an exemplary flow diagram according to at least one embodiment of the systems and methods disclosed herein.

The following sections I-X provide a guide to interpreting the present application.

I. Terms

The term "product" means a machine, manufacture and/or composition of matter, unless expressly specified otherwise.

The term "process" means a process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise.

The term "variation" of an invention means an embodiment of the invention, unless expressly specified otherwise.

The term "indication" is used in an extremely broad sense. An "indication" of a thing should be understood to include anything that may be used to determine the thing.

An indication of a thing may include an electronic message that identifies the thing (e.g., an identification of a widget by a serial number affixed to the widget, an identification of a widget by one or more characteristics of the widget). An indication of a thing may include information that may be used to compute and/or look-up a thing (e.g., information identifying a machine of which a widget is a part that may be used to determine the widget). An indication of a thing may specify things that are related to the thing (e.g., characteristics of the thing, a name of the thing, a name of a thing related to the thing). An indication of a thing may not specify things that are related to the thing (e.g., a letter "a" may be an indication of a widget of a computer system that is configured to interpret the letter "a" to identify the widget). An indication of a thing may include a sign, a symptom, and/or a token of the thing. An indication, for example, may include a code, a reference, an example, a link, a signal, and/or an identifier. An indication of a thing may include information that represents, describes, and/or otherwise is associated with the thing.

A transformation of an indication of a thing may be an indication of the thing (e.g., an encrypted indication of a thing may be an indication of the thing). An indication of a thing may include the thing itself, a copy of the thing, and/or a portion of the thing. An indication of a thing may be meaningless to a thing that is not configured to understand the indication (e.g., a person may not understand that a letter "a" indicates a widget but it may nonetheless be an indication of the widget because the computer system may determine the widget from the letter "a"). It should be understood that the fact that an indication of a thing may be used to determine the thing does not mean that the thing or anything else is determined. An indication of a thing may include an indication of any number of the thing unless specified otherwise. An indication of a thing may include an indication of other things (e.g., an electronic message that indicates may things). (Indication can be used as a very broad term in claim language. For example: receiving an indication of a financial instrument.)

The term "represent" means (1) to serve to express, designate, stand for, or denote, as a word, symbol, or the like does; (2) to express or designate by some term, character, symbol, or the like; (3) to portray or depict or present the likeness of, as a picture does; or (4) to serve as a sign or symbol of.

A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may include or cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments may cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget, but may possibly include one or more other items as well.

The term "consisting of" and variations thereof mean "including and also limited to", unless expressly specified otherwise. Thus, for example, the sentence "the machine consists of a red widget and a blue widget" means the machine includes the red widget and the blue widget, but does not include anything else.

The term "compose" and variations thereof mean "to make up the constituent parts of, component of or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of", unless expressly specified otherwise. Thus, for example, the sentence "the red widget and the blue widget exclusively compose a machine" means the machine consists of the red widget and the blue widget (i.e. and nothing else).

The terms "a", "an" and "the" refer to "one or more", unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the feature," then the phrase "the feature" should be understood to refer to the previously mentioned "a specific single feature." (It should be understood that the term "a" in "a specific single feature" refers to "one" specific single feature and not "one or more" specific single features.)

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of" each of the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". The phrase "based at least on" is equivalent to the phrase "based at least in part on". For example, the phrase "element A is calculated based on element B and element C" covers embodiments where element A is calculated as the product of B times C (in other words, A=B×C), embodiments where A is calculated as the sum of B plus C (in other words, A=B+C), embodiments where A is calculated as a product of B times C times D, embodiments where A is calculated as a sum of the square root of B plus C plus D times E, and so on.

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number and the data also represents something else".

The term "whereby" is used herein only to precede a clause or other set of words that express only the intended result, objective or consequence of something that is explicitly recited before the term "whereby". Thus, when the term "whereby" is used in a claim, the clause or other words that the term "whereby" modifies do not establish specific further limitations of the claim or otherwise restrict the meaning or scope of the claim.

The terms "e.g", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data"

that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function and the second of the two machines has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers in the range, unless expressly specified otherwise. For example, the range "1 to 10" includes the integers from 1 to 10 (e.g., 1, 2, 3, 4, . . . 9, 10) and non-integers (e.g., 1.0031415926, 1.1, 1.2, . . . 1.9).

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), rendering into electronic format or digital representation, ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing, averaging and the like.

The term "determining" does not imply that mathematical processing must be performed, and does not imply that numerical methods must be used, and does not imply that an algorithm is used.

The term "determining" does not imply that any particular device must be used. For example, a computer need not necessarily perform the determining.

The term "determining" may include "calculating". The term "calculating" should be understood to include performing one or more calculations. Calculating may include computing, processing, and/or deriving. Calculating may be performed by a computing device. For example, calculating a thing may include applying an algorithm to data by a computer processor and generating the thing as an output of the processor.

The term "determining" may include "referencing". The term "referencing" should be understood to include making one or more reference, e.g., to a thing. Referencing may include querying, accessing, selecting, choosing, reading, and/or looking-up. The act of referencing may be performed by a computing device. For example, referencing a thing may include reading a memory location in which the thing is stored by a processor.

The term "determining" may include "receiving". For example, receiving a thing may include taking in the thing. In some embodiments, receiving may include acts performed to take in a thing, such as operating a network interface through which the thing is taken in. In some embodiments, receiving may be performed without acts performed to take in the thing, such as in a direct memory write or a hard wired circuit. Receiving a thing may include receiving a thing from a remote source that may have calculated the thing.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. In some embodiments, such a plurality of computer-based devices may operate together to perform one step of a process such as is common in grid computing systems. In some embodiments, such a plurality of computer-based devices may operate provide added functionality to one another so that the plurality may operate to perform one step of a process such as is common in cloud computing systems. (Conversely, a single computer-based device may be substituted with multiple computer-based devices operating in cooperation with one another. For example, a single computing device may be substituted with a server and a workstation in communication with one another over the internet) Accordingly, the various functionality that is described as being possessed by more than one device or article may alternatively be possessed by a single device or article.

The functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

IV. Disclosed Examples and Terminology are not Limiting

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. § 1.72(b).

The headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The disclosed invention is widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims that recite anything other than a statutory class shall be interpreted to recite purposes, benefits and possible uses of the claimed invention, and such preambles shall not be construed to limit the claimed invention.

The present disclosure is not a literal description of all embodiments of the invention. Also, the present disclosure is not a listing of features of the invention which must be present in all embodiments.

All disclosed embodiments are not necessarily covered by the claims (even including all pending, amended, issued and canceled claims). In addition, a disclosed embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries. Devices are in communication with one another if they are capable of at least one-way communication with one another. For example, a first device is in communication with a second device if the first device is capable of transmitting information to the second device. Similarly, the second device is in communication with the first device if the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

The term "compute" shall mean to determine using a processor in accordance with a software algorithm.

A "processor" means one or more microprocessors, central processing units (CPUs), computing devices, microcontrollers, digital signal processors, graphics processing units (GPUs) or like devices or any combination thereof, regardless of the architecture (e.g., chip-level multiprocessing or multi-core, RISC, CISC, Microprocessor without Interlocked Pipeline Stages, pipelining configuration, simultaneous multithreading, microprocessor with integrated graphics processing unit, GPGPU).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the method.

The apparatus that performs the process can include a plurality of computing devices that work together to perform the process. Some of the computing devices may work together to perform each step of a process, may work on separate steps of a process, may provide underlying services that other computing devices that may facilitate the performance of the process. Such computing devices may act under instruction of a centralized authority. In another embodiment, such computing devices may act without instruction of a centralized authority. Some examples of apparatus that may operate in some or all of these ways may include grid computer systems, cloud computer systems, peer-to-peer computer systems, computer systems configured to provide software as a service, and so on. For example, the apparatus may comprise a computer system that executes the bulk of its processing load on a remote server but outputs display information to and receives user input information from a local user computer, such as a computer system that executes VMware software.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any non-transitory medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), wireless local area network communication defined by the IEEE 802.11 specifications whether or not they are approved by the WiFi Alliance, SAP, ATP, Bluetooth™, and TCP/IP, TDMA, CDMA, and 3G; and/or (iv) encrypted to ensure privacy or prevent fraud in any of a variety of ways well known in the art.

The term "database" refers to any electronically-stored collection of data that is stored in a retrievable format.

The term "data structure" refers to a database in a hardware machine such as a computer.

The term "network" means a series of points or nodes interconnected by communication paths. For example, a network can include a plurality of computers or communication devices interconnected by one or more wired and/or wireless communication paths. Networks can interconnect with other networks and contain subnetworks.

The term "predetermined" means determined beforehand, e.g., before a present time or a present action. For example, the phrase "displaying a predetermined value" means displaying a value that was determined before the act of displaying.

The term "condition" means (1) a premise upon which the fulfillment of an agreement depends, or (2) something essential to the appearance or occurrence of something else.

The term "transaction" means (1) an exchange or transfer of goods, services, or funds, or (2) a communicative action or activity involving two parties or things that reciprocally affect or influence each other.

Thus a description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel®, Pentium®, or Centrino™, Atom™ or Core™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

As used herein, the term "encryption" refers to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back in to plaintext. An example of an asymmetric key algorithm is the RSA algorithm.

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application will be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference. Conversely, the definitions provided in this application should not be used to limit, define, or otherwise construe any term of any document incorporated herein by reference. The definitions set forth explicitly in this application are controlling notwithstanding the description of particular embodiments that may be incompatible with the definition(s).

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art refers to the prosecution history of the present application, but not to the prosecution history of any other patent or patent application, regardless of whether there are other patent applications that are considered related to the present application, and regardless of whether there are other patent applications that share a claim of priority with the present application.

Detailed Description of Exemplary Embodiments

In various embodiments, a Spectrum Exchange may create a forum for securitizing spectrum use rights, initially offering spectrum use rights, and after-market trading of spectrum use rights that ensures fair pricing and liquidity. In some embodiments, the Spectrum Exchange may achieve fair pricing and liquidity by publishing critical, real-time data pertaining to use rights both at offer and in the after-market. In some embodiments, the availability of such data may inform market participants as to relative value of spectrum use rights. In some embodiments, the Spectrum Exchange may be responsible for ensuring that the data is made available on the Spectrum Exchange on a real-time basis to all market participants.

FIG. 1 depicts an exemplary flow diagram according to at least one embodiment of the methods disclosed herein.

Securitization of Radio Frequency ("RF" or "Spectrum").

Blocks 1-5 of FIG. 1 depict an exemplary method for securitizing radio frequency usage rights.

In block 1 of FIG. 1, an entity such as the spectrum holder or exchange may identify information relating to spectrum use rights for initial offer on the Spectrum Exchange ("SE"). In some embodiments, all or a portion of this information may be published on the exchange, e.g., to some or all trading participants (e.g., qualified participants). Such information may include one or more of the following:

a. RF Band(s). Information about the radio frequency may be disclosed, such as specific frequency ranges (bands) leased by government and commercially licensed entities to third-parties. The Spectrum Exchange may enable the sub-leasing of portions of leased frequency ranges or rights to use proportionate capacity of the leased frequency ranges.

b. Covered territory—Specific geographic areas for which spectrum bands are leased. The Spectrum Exchange may publish detailed data (e.g., in map and coordinate form) specifying the geographic area over which the spectrum band is leased. The Spectrum Exchange may enable the sub-leasing of portions of leased geographies.

c. Associated equipment available to lease (i.e. towers, antennae, microcells, multiplexers, backhaul, etc.) and associated lease rate for such equipment. In some embodiments, the Spectrum Exchange would publish lease rates for equipment available for use by lessees in specific frequency ranges and geographies. Such equipment (which includes but is not limited to towers, fixed antennae, multiplexing and backhaul) may be owned by the government, lessees or third-parties. By publishing lease rates for such equipment, the Spectrum Exchange will facilitate trading in underlying lease interests. By knowing the cost of utilizing available equipment, spectrum lessees are better able to accurately value spectrum leases. In the same way that the Spectrum Exchange facilitates trading in spectrum leases, the Spectrum Exchange facilitates trading in related equipment leases.

d. Amount of bandwidth used historically (in the offered band and covered territory) by spectrum holder offering use rights. In some embodiments, Spectrum Lessors may be requested to (and may be obligated to) inform the Spectrum Exchange of the amount of time (e.g., expressed as a percentage) the specific frequency ranges in specific geographies have been used, e.g., by the spectrum lessor. The Exchange may publish (and may be obligated to publish) this data in order to provide lessees with desired information regarding the historical encumbrance of their leased spectrum by the government or commercially licensed entity. In some embodiments, the government and/or commercially licensed entities may not be obligated to inform the Spectrum Exchange why they have historically used the leased spectrum. In some embodiments, such entities may only be requested to (or be obligated to) inform the exchange and/or other entities how frequently they have reserved the leased spectrum (by band and geography) historically. In some embodiments, spectrum lessees may use this data published by the Spectrum Exchange to accurately price or value lease interests. In some embodiments, constantly updated information regarding the percentage of time leased spectrum has been reserved for priority use may have a significant impact on the expected value to other parties of spectrum leased for secondary use. In some embodiments, by providing this data, the Spectrum Exchange may facilitate trading in spectrum interests by providing lessees with important information regarding historical, and therefore expected, capacity available.

e. Amount of bandwidth offered.

f. Term of use rights, such as the term over which a lease is made available. As is the case with frequency capacity and geography (see above), lease terms can be broken down into shorter terms to sub-lessees.

g. Known interference issues. In some embodiments, frequency rights may be transferred subject to a senior right held by an entity such as the government to use all or a portion of such frequency. For example, the government may retain a right to take over full usage of the frequency at any time (e.g., such as a national emergency), e.g., and preempt any other user from using such frequency.

In block 2, an entity such as a Spectrum holder may communicate data (e.g., such as the above data) to the Spectrum Exchange. For example, a spectrum holder may electronically convey filing data (above) to the Spectrum Exchange.

In block 3, information about a potential contract may be transmitted. For example, a draft initial offering of use rights agreement may be sent to one or more entities such as a spectrum holder. The agreement may be negotiated between relevant parties, e.g., electronically. In some embodiments, the Spectrum Exchange and spectrum holder may agree to initial offer price and other deal terms. In block 4, information about a contract may be published. For example, an initial offering of use rights may publish electronically on the Spectrum Exchange. In some embodiments, a consistent form may be used for inputting key data for each initial offering made available in pre-set locations on initial offering of use rights. For example, an electronic template may be displayed on an interface that can be filled out by exchange participants.

FOR EXAMPLE: The United States Government ("USG") decides to lease secondary use rights in Dade County, Fla. in the 1755-1850 MHz band. USG identifies 20 antennae and 12 associated towers and sets the lease rate for this equipment at $120,000 per annum. USG identifies the geographic reach of each antenna and determines that 80% of Dade County's 2.5 mm POPs are covered by existing infrastructure. USG identifies all backhaul equipment in the market and determines to lease it at $25,000 per annum. USG calculates its historical use at 0.005% of spectrum capacity at any given time without disclosing what it has used the capacity for. USG determines that it wishes to make the secondary use rights available for an initial period of two years. USG identifies all known interference issues in the market. USG sets any additional terms associated with the secondary use rights (for example, USG may elect to require holders of secondary use rights to use at least a minimum amount of the RF capacity covered by the lease and force the lessee to vacate the lease if such usage threshold is not met). USG files all data in a standardized template with the Spectrum Exchange. Once received and reviewed by the Spectrum Exchange, USG and the Spectrum Exchange agree on an initial offer price of $20,000,000 per annum which equates to approximately $0.11 per MHz POP. Then the secondary use rights offering is announced and terms are published on the Spectrum Exchange.

Initial Offering of Use Rights

In block 5, an entity such as the Spectrum Exchange may conduct placement of use rights, e.g., electronically.

In some embodiments, one or more initial purchasers may enter into use rights agreements (e.g., with an entity such as a government entity), e.g., administered by the Spectrum Exchange.

a. In some embodiments, use rights agreements may require initial purchasers and their successors/assigns to report all usage of spectrum to the Spectrum Exchange during the term of the use rights. Spectrum use rights holders may inform (e.g., and may be obligated to inform) one or more other entities (such as the Spectrum Exchange) of the volume of capacity of their spectrum leases they use, e.g., on a rolling basis. In certain cases, spectrum lessors (and/or exchange rules) may require that lessees utilize a minimum amount of leased capacity. In some embodiments, in instances in which this is made explicit in the lease transaction and published on the Spectrum Exchange, lessees failing to report a minimum level of usage may forfeit their lease interest, and the Spectrum Exchange may re-offer the foregone lease interest. In some embodiments, by publishing the amount of capacity utilized by spectrum lessees, trading in lease interests may be better facilitated by the Spectrum Exchange. In some embodiments, acquirors of lease interests may rely on the lease capacity utilization data of lessees to value such leases or fractional interests therein. Capacity utilization may be displayed, e.g., dynamically and in real-time on the Spectrum Exchange, e.g., and on user interfaces of each exchange participant.
  b. In some embodiments, use rights agreements may require initial purchasers and their successors/assigns to report all improvements (i.e. towers, antennae, microcells, multiplexers, backhaul, etc.) to the Spectrum Exchange, e.g., during the term of the use rights. Improvements may be displayed dynamically and in real-time on the Spectrum Exchange and/or at user display devices.
  c. In some embodiments, use rights agreements may require initial purchasers and their successors/assigns to maintain accurate records of the geography covered by their lease agreements as well as the geography actually covered by fixed antenna in the market. Changes to actual coverage may be displayed dynamically and in real-time on the Spectrum Exchange and/or at user devices.
  d. In some embodiments, use rights agreements may require initial purchasers and their successors/assigns to report all known interference issues to the Spectrum Exchange, e.g., during the term of the use rights. Interference issues (e.g., as they occur) may be displayed, e.g., dynamically and in real-time on the Spectrum Exchange and/or at user devices.

In some embodiments, initial purchasers may receive certificates evidencing their ownership of use rights.

In some embodiments, the Spectrum Exchange may maintain records of all initial purchasers.

FOR EXAMPLE: The Spectrum Exchange and USG determine to organize this initial offer as a time-limited auction, and announce that bids will be accepted over a 48 hour period. All auction participants are encouraged to monitor bidding activity on relevant Spectrum Exchange pages published electronically. The Spectrum Exchange begins to receive bids telephonically and on the Spectrum Exchange electronically. Initial bids are at the offer price of $20,000,000 and are published on the Spectrum Exchange. USG determines to modify the lease to include a minimum use requirement of 50% of available capacity. Subsequent bids increase to $30,000,000 per annum (or $0.16 per MHz POP) and the Spectrum Exchange and spectrum holder agree to close bidding and complete the initial offer. The Spectrum Exchange announces that Sprint is the initial purchaser. Sprint enters into the use rights agreements with USG and begins to immediately serve its customers in Dade County that have devices operable in the 1755-1850 MHz range. Certain Sprint customers in the region already have devices that are operable in the 1755-1850 MHz range. Others are provided with peripheral radios (i.e. dongles) that receive and transmit in the 1755-1850 MHz range and can be connected with smartphones, tablets and computers. When an unidentified aircraft approaches Miami a week after Sprint's initiation of operations in the 1755-1850 MHz range, the Department of Defense ("DOD") reclaims for its priority use the 1755-1850 MHz range for a period of 2.5 hours. When DOD reclaims the RF, all Sprint devices operating in the 1755-1850 MHz range receive a wireless electronic instruction to discontinue operation in the range until further notice. Those devices automatically tune to alternative frequency operated by Sprint, and the customers' service is not interrupted. After 2.5 hours, another wireless electronic instruction is sent by DOD to all Sprint devices operating in the 1755-1850 MHz range that they may resume operating in the range. DOD supplies the Spectrum Exchange with their priority use data, indicating that they occupied 100% of the 95 MHz channel for a period of 2.5 hours approximately 24 hours after the event which remains classified. The Spectrum Exchange updates the historical priority usage reporting, shifting the trailing usage rate from 100% of the 95 MHz channel 0.005% of the time over the past three years to 0.010% of the time over the past three years.

Aftermarket Sales of Use Rights

Block 6 depicts an exemplary method for trading radio frequency rights, e.g., in a secondary market. In block 6, an entity such as an initial purchaser may elect to re-sell or otherwise transfer (or offer to transfer) all or a portion of spectrum use rights, e.g., via the Spectrum Exchange. For example, an entity may offer to sell all of the entity's ownership or leasehold interest in one or more RF bands (e.g., for a particular territory(ies) for a particular time(s)).

An entity may also offer to buy or sell a portion (e.g., a fractional portion) of what is held by the entity for one or more RF bands (e.g., for one or more territories and times). For example, an entity may offer to buy or sell all or a portion of the entity's RF band, capacity (e.g., for one or more specific bands), and/or territory(ies). In each case, in some embodiments the Spectrum Exchange may request and/or require such bidder/offeror to disclose (e.g., to the exchange and/or market participants) all or a portion of such data that was available concerning such usage rights in the primary offering of such rights (if any).

In some embodiments, purchasers of spectrum use rights (e.g., sold in a secondary market on the exchange) may provide (and/or be requested or obligated to provide) the Spectrum Exchange with the same reporting that initial purchasers agreed to provide. For example, in some embodiments, use rights agreements may require initial purchasers and their successors/assigns to report all usage of spectrum to the Spectrum Exchange, e.g., during the term of the use rights. In some embodiments, use rights agreements may require initial purchasers and their successors/assigns to report all improvements (i.e. towers, antennae, microcells, multiplexers, backhaul, etc.) to the Spectrum Exchange, e.g., during the term of the use rights. Use rights agreements may require initial purchasers and their successors/assigns to report all known interference issues to the Spectrum Exchange during the term of the use rights.

FOR EXAMPLE: After six months of operations, Sprint is using approximately 30% of the capacity it acquired under its secondary use rights agreement. Sprint initially informed the Spectrum Exchange that Sprint was using approximately 5% of the capacity, but customer uptake of the mobile video service plan made possible by operating in the 1755-1850 MHz band has been brisk. Based on data broadly available on the Spectrum Exchange indicating trading values for 1755-1850 MHz secondary use rights in other geographies, Sprint determines that it could re-sell a portion of its leased capacity at $0.25 per MHz POP per annum. Accordingly, Sprint files data with the Spectrum Exchange indicating its offer to re-sell 60% of the capacity of its secondary use rights in three equal blocks of 20% each. Bidding ensues on the Spectrum Exchange. Freedompop, MetroPCS and TIAA-CREF (a financial institution) each acquire a block at the offer price. Freedompop and MetroPCS enter into use rights agreements with Sprint and immediately begin their own operations in the 1755-1850 MHz bands. TIAA-CREF indicates that it is not interested in operating their secondary use rights and will hold them for re-sale. TIAA-CREF holds its secondary use rights for the maximum time it is able in order not to violate the minimum use requirement of the master lease agreement between Sprint and USG. TIAA-CREF then sells its secondary use rights to Cognitive Radio, Inc. Cognitive Radio, Inc. operates a nationwide mobile data network utilizing spectrum rights it acquires through the Spectrum Exchange in a variety of bands, and lease rights it holds to serve customers in Dade County in the PCS band will soon expire. The Olympics are hosted in Miami. NBC wishes to lease 20% of the 1755-1850 MHz band for a two month period to ensure that 3,000 staff on location in central Miami will have adequate supply of spectrum for video-based mobile data applications. NBC publishes on the Spectrum Exchange its desire to sub-lease this capacity for two months in downtown Miami (a sub-region of Dade County). NBC specifies that it will not lease incumbent tower, antenna and backhaul equipment as it will deploy a temporary/portable network of supporting RF infrastructure. The Spectrum Exchange conducts a Reverse Auction over a 3 hour period to fill NBC's bid. Each of the incumbent secondary use right holders (Sprint, Freedompop MetroPCS and Cognitive Radio, Inc.) initially offer a small portion of their capacity at high prices. Through successive bidding, NBC attains two sub-leases (one from Cognitive Radio Inc. and the other from Freedompop) for 10% of the 1755-1850 MHz band at a price per MHz POP of $0.40.

In addition, NBC calculates the expected path-loss associated with its lease of secondary use rights using the Spectrum Exchange's electronic system. Spectrum Exchange, using its database of information on spectrum ownership and operation by specific geography that it maintains as well as similar complimentary data maintained by others, is able to calculate expected path-losses given spectrum being activated at specific power levels and in specific geographies given current configurations. NBC is able to estimate the validity of Spectrum Exchange path-loss estimates as Spectrum Exchange publishes all known interference issues. To the extent that interference issues arise that Spectrum Exchange did not identify prior to changes to spectrum utilization in a specific geography, such error is published on the Spectrum Exchange. Primary and secondary use rights holders are incentivized to report interference issues in such a way as to provide a check against the efficacy of Spectrum Exchange's database and associated algorithms. This system of virtual path-loss estimate backed up by accuracy rate data enables NBC to more confidently bid for its leased use rights.

It should be appreciated that various exemplary methods of the present application may include some or all of the actions described in FIG. 1, and they need not be performed in exactly the order described, but rather may be performed in any order consistent with this application as described herein.

Spectrum Exchange's Real-Time Information Publishing

Figure 2:
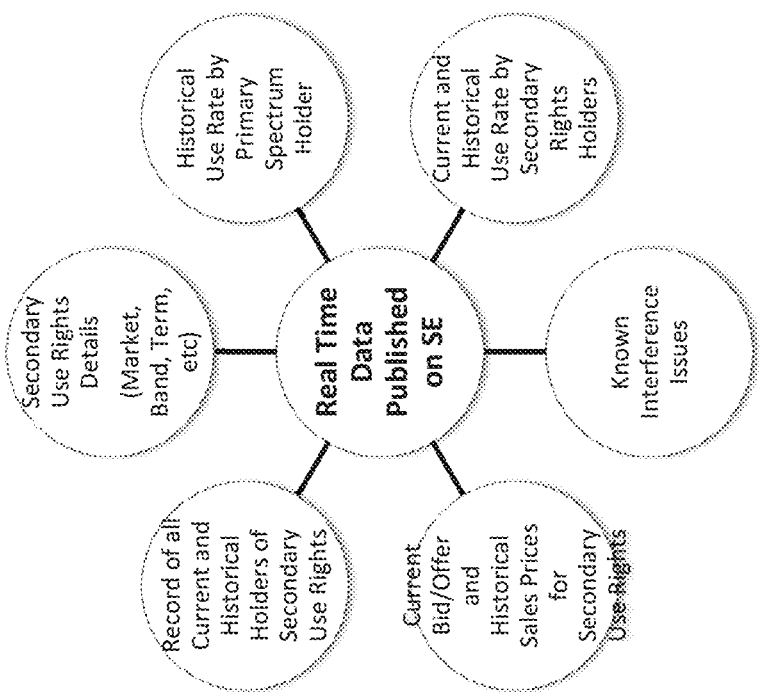
FIG. 2 depicts an exemplary data flow diagram according to at least one embodiment of the systems and methods disclosed herein.

FIG. 2 depicts an exemplary data flow diagram according to at least one embodiment of the systems and methods disclosed herein.

In some embodiments, for each spectrum use right offered via the Spectrum Exchange, the Spectrum Exchange may maintain a real-time report of all pertinent spectrum use right information provided by spectrum holders and purchasers. Such report information may comprise information about RF Band(s), covered territory, associated equipment available to lease (i.e. towers, antennae, microcells, multiplexers, backhaul, etc.), amount of bandwidth used (in the offered band and covered territory) historically by spectrum holder offering use rights (and/or any other entities using such spectrum), amount of bandwidth offered, term of use rights, known interference issues, and other information related to such rights or relevant to the exchange of such rights.

In some embodiments, the Spectrum Exchange may publish information regarding one or more prices at which: 1) holders acquired spectrum use rights; 2) holders would be willing to sell spectrum use rights; and 3) prospective acquirers would be willing to acquire spectrum use rights. In some embodiments, holders and prospective acquirers of spectrum use rights may submit offers and bids electronically through the Spectrum Exchange. Such offers and bids may be made anonymously or semi-anonymously, such that various pieces of information about the party submitting a bid or offer may not be disclosed to one or more users on the exchange. For example, the identity of the party submitting the bid or offer may not be disclosed to other market participants (or only to specific market participants, e.g., of a specific type designated by the party submitting the bid or offer). For example, the bidder or offeror may specify criteria concerning what types of information about the bidder/offeror should be disclosed (e.g., and when it should be disclosed) to other participants in the exchange.

In some embodiments, the Spectrum Exchange may receive bids and offers for frequency usage rights. Bids, offers, execution prices, quantities, and other market data may be published at the Exchange and/or at user devices. The exchange may match bids and offers (e.g., in time and price priority) and facilitate the exchange of certificates of ownership between holders and acquirers of such rights. In some embodiments, the Spectrum Exchange may maintain a record of all holders and acquirers of spectrum use rights.

In some embodiments, the spectrum exchange and participant users may input, receive, transmit, display, match, execute, and otherwise manage orders using software similar or identical to that used for trading securities. For example, trading software and systems that may be used in various embodiments may include the eSpeed GUI of BGC Partners, Inc., the eSpeedometer module, BGC Pro, or Trading Technologies "X-Trader" interface, for example. For example, RF usage interests may be traded by hitting bids and lifting offers. In some embodiments, futures contracts on usage rights may also be created, offered, and traded on an exchange.

Additional Features

In some embodiments, a dongle may be used as a receiver and/or transmitter to access one or more frequencies, such as frequencies not typically accessible from various commercial phones and computers. The dongle may be licensed by an entity such as a holder of frequency rights in one or more frequencies accessible via the dongle (or an entity associated with such holder, such as a sublicense). Users may pay usage fees for using the dongle, e.g., for use (e.g., limited or unlimited use such as unlimited data over the internet using such frequency/ies).

In some embodiments, the exchange or an entity associated therewith may monitor usage of one or more frequencies, such as frequencies traded via the exchange and/or frequencies used or operated by the exchange or one or more participants on the exchange. Usage data may be monitored and used, such as websites visited and videos downloaded. User and usage data could be mined, e.g., in a manner similar to how ISPs and search engine providers monitor and use such data. For example, it may be determined that a specific user or user type is likely to visit a specific website or type of website. Targeted ads may be displayed to such users.

In some embodiments, usage of one or more specific frequencies may be subject to one or more restrictions. For example, an original holder (such as the government) may require that frequency usage be provided (e.g., only) on qualified user devices. In some embodiments, qualified user devices may be required to monitor a control signal (e.g., at a specific "control" frequency that may be within or outside a licensed range). The control signal may provide permission information that specifies when users may or may not use the relevant frequency. For example, user devices may use the frequency whenever the control signal broadcasts an "all clear" message. When the control signal indicates a "no access" signal (e.g., during a national emergency), the user devices may stop or disable access to the relevant frequency band, e.g., until the control signal indicates the "all clear" message. The control signal may also broadcast scheduled interruption information, such as "no usage from 6-7 pm eastern", e.g., to preempt usage from 6-7 pm for a test or other purpose. In some embodiments, restrictions may also operate at the cell tower/transmitter level, e.g., in a similar manner.

Figure 3:
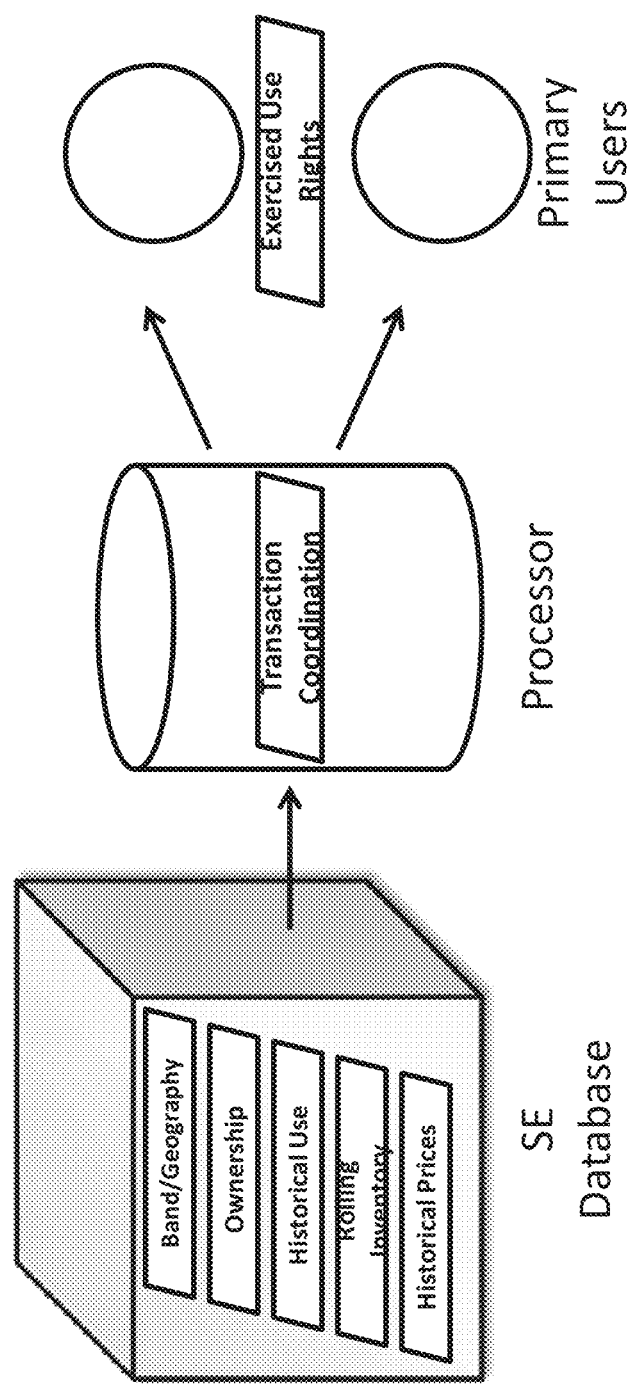
FIG. 3 depicts an exemplary system diagram according to at least one embodiment of the systems and methods disclosed herein.

FIG. 3 depicts an exemplary system diagram according to at least one embodiment of the systems and methods disclosed herein. As shown in FIG. 3, at least one spectrum exchange database may communicate electronically with at least one processor, which may communicate electronically with one or more users and/or user computers. User computers may have one or more processors and one or more input and display or other interface modules.

FIG. 4 depicts an exemplary database diagram according to at least one embodiment of the systems and methods disclosed herein. As shown in FIG. 4, at least one spectrum exchange database may store a variety of types of information. Such information may be tracked by the SE dynamically over time, and the database may be updated as information changes, e.g., continually or in substantially real time. Some or all information stored in the database may be transmitted and/or displayed at user computers.

FIG. 5 depicts an exemplary data publication diagram according to at least one embodiment of the systems and methods disclosed herein. As shown in FIG. 5, primary and secondary holder usage information may be tracked and stored in the spectrum exchange database.

RF engineering features may be automated in the Spectrum Exchange. For example, path-loss calculations may be automated and provided and/or published via the SE. For example, if Carrier 1 wants spectrum rights for the 1755-1780 MHz band in Kansas City for high-power base stations and Carrier 2 wants to use the same frequencies in the surrounding suburbs and exurbs for mini-cells, automating path-loss calculations may better enable both carriers to value the desired spectrum and help determine spacing between adjacent networks to minimize the likelihood of co-channel interference between neighbors.

In some embodiments, the SE may use geolocation to define exclusion zones around incumbents, military bases and similar facilities. In some embodiments, geolocation database administrators may control a "kill switch" that, when actuated, causes a power down of any new entrants that stray into exclusion zones.

The above description is included to illustrate the operation of the preferred embodiments and is not meant to limit the scope of the invention. From the above discussion, many variations will be apparent to one skilled in the relevant art that would yet be encompassed by the spirit and scope of the invention. For example, while many of the embodiments are described for radio frequency usage rights, various embodiments may be directed to systems and methods for facilitating the exchange of other trading instruments and rights, such as financial instruments, personal property rights, real property rights, government-held rights, utility rights, and other rights and trading products.

The following are exemplary embodiments. They are numbered for the sake of clarity:

1. A method comprising:

receiving, by at least one processor, information defining a plurality of RF usage rights, the plurality of RF usage rights comprising at least (1) a first RF usage right defining (i) at least a first geographical area and (ii) a first RF frequency range and (2) a second RF usage right defining at least (i) a second geographical area different from the first geographical area and (ii) a second RF frequency range different from the first RF frequency range;

causing, by the at least one processor, the plurality of RF usage rights to be offered for sale on an electronic exchange;

receiving, by the at least one processor, at least one bid to purchase the first RF usage right from a first of a plurality of bidders on the electronic exchange;

causing, by the at least one processor, a trade to be transacted wherein the first RF usage right is purchased by the first bidder;

responsive to the trade, causing, by the at least one processor, an indicia of ownership of the first RF usage right to be transmitted to the first bidder;

causing, by the at least one processor, information about the trade to be disclosed to a plurality of participants on the electronic exchange.

2. The method of embodiment 1, in which the usage right is further defined at least by a time period of use.

3. The method of any of embodiments 1-2, in which the time period of use is defined by a start time and an end time.

4. The method of any of embodiments 1-3, in which the usage right is further defined at least by a specified amount of use.

5. The method of embodiment 4, in which the specified amount of use comprises a specified amount of data that can be transmitted over the first RF frequency range.

6. The method of any of embodiments 4 and 5, in which the specified amount of use comprises a specified data bandwidth.

7. The method of any of embodiments 1-6, in which the right to use the RF frequency range is subject to a preemption right by a preemption entity.

8. The method of embodiment 7, in which the preemption entity comprises a government entity.

9. The method of any of embodiments 7 and 8, further comprising:
receiving notification that the preemption entity is exercising its right to preempt use of the first RF frequency range; and
responsive to receiving the notification, causing a plurality of wireless communication devices configured to communicate via the first RF frequency range to stop communicating via the first RF frequency range.

10. The method of embodiment 9, in which the act of causing a plurality of wireless devices to stop communicating via the first RF frequency range comprises causing to be transmitted to the wireless communication devices an instruction to stop communicating via the first RF frequency range.

11. The method of embodiment 10, in which the instruction further comprises an instruction to use at least one third RF frequency range that does not overlap the first RF frequency range.

12. The method of any of embodiments 1-11, further comprising:
receiving a notification that the preemption entity is ceasing preemption of the first RF frequency range;
responsive to receiving the notification that the preemption entity is ceasing preemption of the first RF frequency range, causing a plurality of wireless communication devices to enable communication via the first RF frequency range.

13. The method of any of embodiments 1-12, further comprising:
after causing the trade to be transacted, receiving from the first bidder an offer to sell the first RF usage rights;
receiving at least one bid to purchase the first RF usage rights; and
causing a trade to be transacted in the first RF usage rights.

14. The method of embodiment 13, further comprising causing information about the trade to be transmitted to the plurality of participants on the electronic exchange.

15. The method of any of embodiments 1-14, further comprising:
prior to receiving the at least one bid, transmitting to the plurality of participants on the electronic exchange information about an inventory of existing equipment that could be used in connection with the first RF usage right in the first geographic area.

16. The method of any of embodiments 1-15, further comprising:
after causing the trade to be transacted, receiving from the first bidder an offer to sell a first portion of the first RF usage rights;
receiving at least one bid to purchase the portion of the first RF usage rights; and
causing a trade to be transacted for the portion of the first RF usage rights.

17. The method of embodiment 16, further comprising:
after causing the trade to be transacted, receiving from the first bidder an offer to sell at least one second portion of the first RF usage rights;
receiving at least one bid to purchase the at least one second portion of the first RF usage rights; and
causing at least one trade to be transacted for the at least one second portion of the first RF usage rights.

18. The method of embodiment 16, in which the first bidder retains a second portion of the first RF usage rights.

19. The method of any of embodiments 1-18, in which the act of causing a trade to be transacted comprises transferring ownership of the first RF usage right from a government entity to the first bidder.

20. The method of any of embodiments 1-19, in which the acts of causing the plurality of RF usage rights to be offered for sale on the electronic exchange and receiving at least one bid to purchase the first RF usage right comprise conducting a reverse auction for the first RF usage rights.

21. The method of any of embodiments 1-20, in which the acts of causing the plurality of RF usage rights to be offered for sale on the electronic exchange and receiving at least one bid to purchase the first RF usage right comprise conducting a Dutch auction for the first RF usage rights.

22. The method of any of embodiments 1-21, further comprising, prior to the act of receiving at least one bid to purchase the first RF usage right, requesting a quote for the first RF usage rights.

23. The method of any of embodiments 1-22, after causing the trade to be transacted, receiving information about usage of the RF frequency range pursuant to the first RF usage right.

24. The method of embodiment 23, further comprising:
after receiving information about the usage of the RF frequency range pursuant to the first RF usage right, transmitting the information about the usage to the plurality of participants on the electronic exchange.

25. The method of any of embodiments 1-24, further comprising:
monitoring usage of a plurality of RF frequency ranges pursuant to a plurality of associated RF usage rights;
transmitting information about the monitored usage to the plurality of participants on the exchange.

26. The method of any of embodiments 1-25, further comprising:
causing to be transmitted to the plurality of participants, for each of a plurality of RF frequency ranges, information about historical ownership of the RF frequency range, information about historical use of the RF frequency range, and historical prices associated with the RF frequency range.

27. The method of embodiment 26, in which the historical prices associated with the RF frequency ranges comprise prices paid for usage rights associated with the RF frequency ranges.

28. The method of embodiment 26, in which the information about historical ownership of the RF frequency range, information about historical use of the RF frequency range, and historical prices associated with the RF frequency range are each associated with a specific geographic area.

29. The method of any of embodiments 1-28, further comprising:

causing to be transmitted to the plurality of participants, for each of a plurality of RF frequency ranges, information about interference associated with the RF frequency range in a geographic area.

30. The method of embodiment any of embodiments 1-29, further comprising:

causing to be offered on the electronic exchange a specified amount of bandwidth over a specified range of RF frequency ranges during a specified period of time in a specified geographical area;

receiving a plurality of bids for the offered amount of bandwidth, the plurality of bids comprising a first bid from a first buyer;

selecting the first bid as the winning bid from among the plurality of bids; and transacting a trade of the amount of bandwidth between an offeror of the amount of bandwidth and the first buyer;

31. The method of embodiment 30, in which the specified range of RF frequency ranges comprises a plurality of different RF frequency ranges, and in which the specified amount of bandwidth may be provided over any one or more of the plurality of different RF frequency ranges during the specified period of time.

32. The method of any of embodiments 1-31, further comprising:

causing a futures contract for an RF usage right to be offered for sale;

receiving a plurality of bids for the futures contract;

transacting a trade for the futures contract.

33. The method of any of embodiments 1-31, further comprising:

prior to receiving the first bid, causing to be transmitted to the plurality of users information about a historical primary use and a current secondary use associated with the first RF frequency range in a geographic area.

34. The method of embodiment 34, in which the information about the historical primary use comprises a percentage of available RF capacity for the first RF frequency range.

35. The method of any of embodiments 33 and 34, in which the information about the current secondary use comprises a percentage of available RF capacity for the first RF frequency range.

36. The method of any of embodiments 1-35, further comprising:

storing information about a current owner of each RF usage right traded on the electronic exchange.

37. The method of any of embodiments 1-36, further comprising:

causing to be transmitted to the plurality of participants information about a current owner of each RF usage right traded on the electronic exchange.

38. The method of embodiment of embodiments 1-37, further comprising:

causing an indicia of ownership to be transmitted to each purchaser of an RF usage right.

39. The method of any of embodiments 1-38, further comprising:

receiving a specification of an RF usage right;

causing to be created a tradable financial instrument associated with the specification;

causing the tradable financial instrument to be offered for sale on the electronic exchange.

40. The method of embodiment 39, further comprising:

receiving a request to conduct secondary trading on the tradable financial instrument;

responsive to the request, causing the tradable financial instrument to be offered for sale on the electronic exchange.

41. A method comprising:

receiving, by at least one processor, information defining a plurality of RF usage rights, the plurality of RF usage rights comprising at least (1) a first RF usage right defining (i) at least a first geographical area and (ii) a first RF frequency range and (2) a second RF usage right defining at least (i) a second geographical area different from the first geographical area and (ii) a second RF frequency range different from the first RF frequency range;

causing, by the at least one processor, the plurality of RF usage rights to be offered for sale on an electronic exchange;

receiving, by the at least one processor, at least one bid to purchase the first RF usage right from a first of a plurality of bidders on the electronic exchange;

causing, by the at least one processor, a trade to be transacted wherein the first RF usage right is purchased by the first bidder;

responsive to the trade, causing, by the at least one processor, an indicia of ownership of the first RF usage right to be transmitted to the first bidder; and causing, by the at least one processor, information about the trade to be disclosed to a plurality of participants on the electronic exchange, in which the usage right is further defined at least by a time period of use, in which the time period of use is defined by a start time and an end time, in which the usage right is further defined at least by a specified amount of use, in which the specified amount of use comprises a specified amount of data that can be transmitted over the first RF frequency range, in which the specified amount of use comprises a specified data bandwidth, in which the right to use the RF frequency range is subject to a preemption right by a government entity, further comprising:

receiving notification that the preemption entity is exercising its right to preempt use of the first RF frequency range; and responsive to receiving the notification, causing a plurality of wireless communication devices configured to communicate via the first RF frequency range to stop communicating via the first RF frequency range, in which the act of causing a plurality of wireless devices to stop communicating via the first RF frequency range comprises causing to be transmitted to the wireless communication devices an instruction to stop communicating via the first RF frequency range, and in which the instruction further comprises an instruction to use at least one third RF frequency range that does not overlap the first RF frequency range.

42. An apparatus comprising:

at least one processor; and at least one memory having instructions stored thereon which, when executed, direct the at least one processor to perform the method of any one of embodiments 1-41.

43. A tangible computer-readable medium having instructions stored thereon that are configured to cause at least one processor to perform the method of any one of embodiments 1-41.

Embodiments and features described herein may also be used with or in conjunction with features and embodiments described in: U.S. Provisional Ser. No. 61/691,249, filed Aug. 20, 2012, entitled "Exchange for Trading Radio Frequency Usage Rights;" U.S. Ser. No. 11/361,713, filed Feb. 24, 2006, entitled "System and Method for Trading Spectrum Rights;" and U.S. Ser. No. 10/913,727, filed Aug. 6, 2004, entitled "System and Method for Trading Wireless Spectrum Rights." The disclosures of these applications are incorporated by reference herein in their entireties. Additional exemplary embodiments and features that may be used with or in conjunction with the features described herein are provided in Appendices I and II, attached hereto.

XI. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the claims herein.

What is claimed is:

1. A method of facilitating an electronic exchange of radio frequency (RF) usage rights, the method comprising:
controlling, by at least one processor:
receiving data representing information defining a plurality of RF usage rights, the plurality of RF usage rights comprising at least (1) a first RF usage right defining (i) at least a first geographical area and (ii) a first RF frequency range and (2) a second RF usage right defining at least (i) a second geographical area different from the first geographical area and (ii) a second RF frequency range different from the first RF frequency range;
communicating, to computing devices of respective bidders on the electronic exchange, the data representing the plurality of RF usage rights to be offered for sale on the electronic exchange;
receiving data representing at least one bid to purchase the first RF usage right by a first bidder from a first computing device of the computing devices;
transacting an electronic trade in which the first RF usage right is purchased through the first computing device;
transmitting electronic indicia of ownership of the first RF usage right to the first computing device;
providing data representing information about the electronic trade to the computing devices;
receiving notification that a preemption entity is exercising its right to preempt use of the first RF frequency range;
responsive to receiving the notification, stopping communication via the first RF frequency range by a plurality of wireless communication devices configured to communicate via the first RF frequency range, in which the stopping communication via the first RF frequency range comprises causing to be transmitted to the wireless communication devices an instruction to stop communicating via the first RF frequency range and to start communicating on another RF frequency range without causing disruption of communication and to continue communicating on the another RF frequency range until receipt of a subsequent instruction to resume communicating on the first RF frequency range;
determining a path-loss calculation associated with RF frequency ranges of the plurality of the RF usage rights to determine values of the plurality of the RF usage rights; and
providing data representing information about the path-loss calculation to the computing devices.

2. The method of claim 1, in which a given RF usage right is defined at least by a time period of use defined by a specified start time and specified end time, and in which the given RF usage right is defined by at least a specified amount of use.

3. The method of claim 2, in which the specified amount of use comprises at least one of (1) a specified amount of data that can be transmitted over the first RF frequency range and (2) a specified data bandwidth.

4. The method of claim 1, in which the second RF frequency range does not overlap the first RF frequency range.

5. The method of claim 1, further comprising:
controlling, by the at least one processor:
after the electronic trade is transacted, receiving from the first computing device an offer to sell the first RF usage right;
receiving from a second computing device at least one bid to purchase the first RF usage right; and
causing an electronic trade to be transacted in the first RF usage right.

6. The method of claim 5, further comprising:
controlling, by the at least one processor:
causing information about the electronic trade to be transmitted to the computing devices; and
prior to receiving the at least one bid, transmitting to the computing devices data representing information about an inventory of existing equipment that could be used in connection with the first RF usage right in the first geographical area.

7. The method of claim 1, further comprising:
controlling, by the at least one processor:
after causing the electronic trade to be transacted, receiving from the first computing device an offer to sell a first portion of the first RF usage right;
receiving at least one bid to purchase the first portion of the first RF usage right; and
causing a second electronic trade to be transacted for the first portion of the first RF usage right.

8. The method of claim 7, further comprising:
controlling, by the at least one processor:
after causing the second electronic trade to be transacted, receiving from the first computing device an offer to sell at least one second portion of the first RF usage right;
receiving at least one bid to purchase the at least one second portion of the first RF usage right; and causing at least one electronic trade to be transacted for the at least one second portion of the first RF usage right, in which the first bidder retains a third portion of the first RF usage right.

9. The method of claim 1, further comprising,
controlling, by the at least one processor:
prior to receiving from the first computing device at least one bid to purchase the first RF usage right, requesting a quote for the first RF usage right.

10. The method of claim 1, further comprising:
controlling, by the at least one processor:
after receiving data representing information about the RF usage of the RF frequency range pursuant to the first RF usage right, transmitting the data representing information about the RF usage to the computing devices;
monitoring usage of a plurality of RF frequency ranges pursuant to a plurality of associated RF usage rights;
transmitting data representing information about the monitored usage to the computing devices; and
causing to be transmitted to the computing devices, for each of a plurality of RF frequency ranges, data representing information about historical ownership of the RF frequency range, information about historical use of the RF frequency range, and historical prices associated with the RF frequency range,
in which the historical prices associated with the RF frequency ranges comprise prices paid for usage rights associated with the RF frequency ranges, and
in which the information about historical ownership of the RF frequency range, information about historical use of the RF frequency range, and historical prices associated with the RF frequency range are each associated with a specific geographic area.

11. The method of claim 1, further comprising:
controlling, by the at least one processor:
causing to be offered on the electronic exchange rights to a specified amount of bandwidth over a specified range of RF frequency ranges during a specified period of time in a specified geographical area;
receiving a plurality of bids for the offered amount of bandwidth, the plurality of bids comprising a first bid from a first buyer;
selecting the first bid as a winning bid from among the plurality of bids; and
transacting an electronic trade of the amount of bandwidth between an offeror of the amount of bandwidth and the first buyer,
in which the specified range of RF frequency ranges comprises a plurality of different RF frequency ranges, and in which the specified amount of bandwidth may be provided over any one or more of the plurality of different RF frequency ranges during the specified period of time.

12. The method of claim 1, further comprising:
controlling, by the at least one processor:
causing a futures contract for an RF usage right to be offered for sale;
receiving from given computing devices a plurality of bids for the futures contract;
transacting an electronic trade for the futures contract.

13. The method of claim 1, further comprising:
controlling, by the at least one processor:
prior to receiving a first bid for the first RF usage right, causing to be transmitted to the computing devices data representing information about a historical primary use and a current secondary use associated with the first RF frequency range in a geographic area, in which the information about the historical primary use comprises a percentage of available RF capacity for the first RF frequency range.

14. The method of claim 1, further comprising:
controlling, by the at least one processor:
receiving data representing a specification of an RF usage right;
causing to be created a tradable financial instrument associated with the specification; and
causing the tradable financial instrument to be offered for sale on the electronic exchange.

15. The method of claim 1, further comprising:
controlling, by the at least one processor:
determining usage data based on usage of at least one RF frequency range; and
determining targeted advertisements based on the usage data.

16. An apparatus for facilitating an electronic exchange of RF usage rights, the apparatus comprising:
at least one processor of an electronic exchange; and
at least one memory having instructions stored thereon which, when executed by the at least one processor, control;
receiving data representing information defining a plurality of RF usage rights, the plurality of RF usage rights comprising at least (1) a first RF usage right defining (i) at least a first geographical area and (ii) a first RF frequency range and (2) a second RF usage right defining at least (i) a second geographical area different from the first geographical area and (ii) a second RF frequency range different from the first RF frequency range;
communicating, to computing devices of respective bidders on the electronic exchange, the data representing the plurality of RF usage rights to be offered for sale on the electronic exchange;
receiving data representing at least one bid to purchase the first RF usage right by a first bidder from a first computing device of the computing devices;
transacting an electronic trade in which the first RF usage right is purchased through the first computing device;
transmitting electronic indicia of ownership of the first RF usage right to the first computing device;
providing data representing information about the electronic trade to the computing devices;
receiving notification that a preemption entity is exercising its right to preempt use of the first RF frequency range;
responsive to receiving the notification, stopping communication via the first RF frequency range by a plurality of wireless communication devices configured to communicate via the first RF frequency range, in which the stopping communication via the first RF frequency range comprises causing to be transmitted to the wireless communication devices an instruction to stop communicating via the first RF frequency range and to start communicating on another RF frequency range without causing disruption of communication and to continue communicating on the another RF frequency range until receipt of a subsequent instruction to resume communicating on the first RF frequency range;
determining a path-loss calculation associated with RF frequency ranges of the plurality of the RF usage rights to determine values of the plurality of the RF usage rights; and providing data representing information about the path-loss calculation to the computing devices.

17. The apparatus of claim 16, in which the instructions, when executed by the at least one processor, control:
   determining usage data based on usage of at least one third RF frequency range; and
   determining targeted advertisements based on the usage data.

18. The apparatus of claim 16,
   in which the at least one third RF frequency range does not overlap the first RF frequency range.

19. A non-transitory computer-readable medium to store instructions for facilitating an electronic exchange of RF usage rights, in which the instructions, when executed by a processor, control:
   receiving data representing information defining a plurality of RF usage rights, the plurality of RF usage rights comprising at least (1) a first RF usage right defining (i) at least a first geographical area and (ii) a first RF frequency range and (2) a second RF usage right defining at least (i) a second geographical area different from the first geographical area and (ii) a second RF frequency range different from the first RF frequency range;
   communicating, to computing devices of respective bidders on the electronic exchange, the data representing the plurality of RF usage rights to be offered for sale on the electronic exchange;
   receiving data representing at least one bid to purchase the first RF usage right by a first bidder from a first computing device of the computing devices;
   transacting an electronic trade in which the first RF usage right is purchased through the first computing device;
   transmitting electronic indicia of ownership of the first RF usage right to the first computing device;
   providing data representing information about the electronic trade to the computing devices;
   receiving notification that a preemption entity is exercising its right to preempt use of the first RF frequency range;
   responsive to receiving the notification, stopping communication via the first RF frequency range by a plurality of wireless communication devices configured to communicate via the first RF frequency range, in which the stopping communication via the first RF frequency range comprises causing to be transmitted to the wireless communication devices an instruction to stop communicating via the first RF frequency range and to start communicating on another RF frequency range without causing disruption of communication and to continue communicating on the another RF frequency range until receipt of a subsequent instruction to resume communicating on the first RF frequency range;
   determining a path-loss calculation associated with RF frequency ranges of the plurality of the RF usage rights to determine values of the plurality of the RF usage rights; and
   providing data representing information about the path-loss calculation to the computing devices.

20. The computer-readable medium of claim 19, in which the instructions, when executed by the at least one processor, control:
   determining usage data based on usage of at least one RF frequency range; and
   determining targeted advertisements based on the usage data.

* * * * *